(12) United States Patent
Morawski et al.

(10) Patent No.: US 10,336,285 B2
(45) Date of Patent: Jul. 2, 2019

(54) AIRBAG MODULE WITH ACTIVE VENT ROTATION COUNTERMEASURE

(71) Applicant: TK Holdings Inc., Auburn Hills, MI (US)

(72) Inventors: Benjamin Morawski, Grosse Pointe Farms, MI (US); Christopher Anderson, Harrison Township, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 37 days.

(21) Appl. No.: 15/697,243

(22) Filed: Sep. 6, 2017

(65) Prior Publication Data

US 2018/0065589 A1 Mar. 8, 2018

Related U.S. Application Data

(60) Provisional application No. 62/384,693, filed on Sep. 7, 2016.

(51) Int. Cl.
*B60R 21/239* (2006.01)
*B60R 21/261* (2011.01)
*B60R 21/264* (2006.01)

(52) U.S. Cl.
CPC .......... *B60R 21/239* (2013.01); *B60R 21/261* (2013.01); *B60R 21/264* (2013.01); *B60R 2021/2395* (2013.01); *B60R 2021/2612* (2013.01)

(58) Field of Classification Search
CPC .................... B60R 21/239; B60R 2021/2395
See application file for complete search history.

(56) References Cited

U.S. PATENT DOCUMENTS

| 6,517,108 | B1 | 2/2003 | Vinton et al. |
| 8,608,197 | B2 | 12/2013 | Eckert et al. |
| 9,376,086 | B2 * | 6/2016 | Nebel ................. B60R 21/2338 |
| 9,403,503 | B2 * | 8/2016 | Buchholz ............. B60R 21/239 |
| 9,434,346 | B2 * | 9/2016 | Weber .................. B60R 21/239 |

(Continued)

FOREIGN PATENT DOCUMENTS

| DE | 10 2005 039 418 A1 | 3/2007 |
| EP | 1769978 A1 | 4/2007 |

(Continued)

*Primary Examiner* — Ruth Ilan
(74) *Attorney, Agent, or Firm* — Gordon Rees Scully Mansukhani, LLP (57) ABSTRACT

An airbag arrangement with a gas bag inflatable by a gas generator to protect a vehicle occupant, whose envelope defines an interior space of the gas bag that can be filled with gas, with a vent opening through which gas can flow out, with an apparatus for controlling the cross-section of the vent opening including a covering part with which the vent opening can be covered to at least partly closed. The arrangement also includes an inflatable gas duct which interacts with the covering part to vary the cross-section of the vent opening. The duct is inflatable by a secondary gas generator, which during inflation interacts with the covering part such that it changes the cross-section of the vent opening. Rotational movement of the inflatable gas duct is restricted by an extended panel secured to the gas bag, a tab anchored nearby, or both.

19 Claims, 9 Drawing Sheets

(56) References Cited

U.S. PATENT DOCUMENTS

| | | | |
|---|---|---|---|
| 9,827,941 B2* | 11/2017 | Haas | B60R 21/2342 |
| 10,131,315 B2* | 11/2018 | Haas, Jr. | B60R 21/239 |
| 2004/0012179 A1 | 1/2004 | Pinsenschaum et al. | |
| 2007/0040366 A1 | 2/2007 | Maidel et al. | |
| 2009/0160169 A1 | 6/2009 | Parks et al. | |
| 2009/0309341 A1* | 12/2009 | Pausch | B60R 21/2338 |
| | | | 280/735 |

FOREIGN PATENT DOCUMENTS

| | | |
|---|---|---|
| GB | 2306409 A | 5/1997 |
| WO | WO 2009/034752 A1 | 3/2009 |
| WO | WO 2011/157631 A1 | 12/2011 |

* cited by examiner

AIRBAG MODULE WITH ACTIVE VENT ROTATION COUNTERMEASURE

CROSS REFERENCE TO RELATED APPLICATIONS

This application claims priority to and the benefit of U.S. Provisional Patent Application No. 62/384,693 filed on Sep. 7, 2016, the entirety of which is hereby incorporated by reference.

SUMMARY

An exemplary airbag module is disclosed in international patent publication WO2011/157631, which is incorporated by reference herein and which discloses an inflatable element for covering a vent opening in a gas bag and releasable connections, preferably in the form of tear seams, attached to the edge regions of the gas bag surrounding the vent opening. After destruction of the tear seams, parts of the inflatable element clear the vent opening or close the opening, and thus in the case of a crash adapt the restraint of the gas bag to certain sensed constraints (vehicle speed, occupant characteristics, seating position, etc.). Independent of the design, the size of the inflatable element must be matched with the size of the associated vent opening. Adapted to various conditions of use, such as vehicle type, kind of airbag module (driver, passenger, side airbag module, etc.), size of the gas bag or characteristic of the gas generator, the vent openings have different shapes and sizes. The dimensioning (blanks, seam contours, fillable volume) of the inflatable elements may also be changed correspondingly. Especially the design of the releasable connections (tear seams) requires a high development effort, since the initiated, desired release should be effected safely and quickly in a broad temperature range, so that in the case of a crash the restraint of the gas bag can be adapted to the above-mentioned constraints in good time.

Further examples of airbag modules are described in detail in, for example, U.S. Pat. Nos. 8,608,197 and 9,403,503, both of which are incorporated by reference herein.

According to the present disclosure an exemplary embodiment of an airbag module includes an airbag or cushion, which is inflatable by means of a gas generator or inflator for the protection of a person. The module may include an at least one vent opening through which gas originating from the airbag module (which was released by the gas generator for inflating the airbag or gas bag) can escape or exit from the airbag, and furthermore a device for actively controlling the opening of the vent. With such a control device it is possible to selectively control the venting of a gas bag or airbag, i.e. the releasing of those gases which were provided by a gas generator and introduced into the gas bag for the protection of a vehicle occupant. Both the inflator or gas generator and the control device may be triggered, for example, depending on the kind and severity of an accident and on the size and/or the weight and/or the seating position of the person to be protected, which can be detected in particular by means of sensors.

As described herein, the active vent arrangement provides for connection of an active vent tube, also referred to as an inflatable gas duct, onto a mounting port of a secondary inflator or micro gas generator (MGG) which allows for various degrees of rotation, including 180 degree and 360 degree rotation of the active vent tube. At times, this rotation may prevent proper deployment of the airbag. For example, inflatable gas ducts may become rotated to the extent that intended deployment of the inflatable gas duct is hindered thereby resulting in delayed, insufficient, or otherwise improper active venting.

The disclosed arrangements provide for an airbag module as described herein that includes an assembly-friendly and reliable arrangement and fixation of the active vent mechanism that prevents unacceptable rotation of the active vent tube.

The arrangement that precludes 180 degree rotation of the active vent tube involves a specific arrangement of one or more tabs located on the end of the active vent tube where the MGG is attached. An exterior tab may be provided. The tab extends to circle around and connect onto a stud or other suitable fastener on a retainer for the gas generator thereby preventing 180 degree rotation of the active vent tube. Along with or in the alternative to the 180 degree rotation countermeasure, a 360 degree counter measure includes an active vent reinforcement sheet that includes an extended panel. The extended panel allows for the vent tube to be sewn into the perimeter stitch of the cushion, thereby restricting the rotation of the tube during installation. Alternatively, a 360 degree counter measure may include an extended panel on the active vent tube itself, which would also restrict the rotation of the tube during installation. To provide another anchor point, another tab may be provided with an end that is secured to and extends from the main panel and side panel, with another end of the tab secured to the same stud as the 180 degree countermeasure tab. The tab limits the rotation of the gas bag during installation.

Although the present disclosure refers primarily to a front passenger-side airbag assembly, it should be understood that the subject matter herein is applicable to a driver side frontal airbag and to an airbag assembly in general.

Terms and phrases used in this document, and variations thereof, unless otherwise expressly stated, should be construed as open ended as opposed to limiting. Furthermore, the use of plurals can also refer to the singular, including without limitation when a term refers to one or more of a particular item; likewise, the use of a singular term can also include the plural, unless the context dictates otherwise.

It is to be understood that both the foregoing general description and the following detailed description are exemplary and explanatory only, and are not restrictive of the invention as claimed.

BRIEF DESCRIPTION OF THE FIGURES

The accompanying drawings, which are incorporated in and form a part of this specification, illustrate embodiments and together with the description, serve to explain the principles of this disclosure.

DETAILED DESCRIPTION

A disclosed embodiment is directed to an airbag module comprising a gas bag including a vent opening through which gas can escape from the gas bag, an inflator for providing gas for inflating the gas bag, a movable vent cover that restricts gas from escaping from the gas bag through the vent opening, an inflatable gas duct, wherein a first end of the inflatable gas duct is located near the inflator and a second end of the inflatable gas duct is connected to the vent cover, wherein the inflatable gas duct includes a tab that is proximate to the first end of the inflatable gas duct, wherein the tab is anchored near the inflator to restrict rotational movement of the inflatable gas duct relative to the inflator, and wherein the inflatable gas duct is configured so that upon inflation of the gas duct the vent cover moves out of a position blocking the vent opening to thereby allow gas to escape from the gas bag through the vent opening. The airbag module further includes a secondary inflator, where the secondary inflator is connected to the first end of the inflatable gas duct. The airbag module further includes a retainer including a stud, wherein the tab of the inflatable gas duct is anchored to the stud. The retainer further includes a main port and a secondary port, where the gas bag is mounted to the main port, where the inflatable gas duct is mounted to the secondary port. The inflator is in fluid connection with the gas bag through the main port of the retainer. The tab of the inflatable gas duct has an opening encircling the stud of the retainer thereby anchoring the tab to the stud. The stud of the retainer is proximate to the secondary port, where the secondary inflator is connected to the first end of the inflatable gas duct through the secondary port, and where the tab of the inflatable gas duct is anchored to the stud. The airbag module further includes a reinforcement sheet, wherein the reinforcement sheet is secured over and to the inflatable gas duct, wherein the reinforcement sheet includes an extended panel secured to the gas bag to restrict rotational movement relative to the gas bag.

Another disclosed embodiment relates to an airbag module for protecting an occupant of a vehicle comprising an inflatable gas bag including a vent opening through which gas can escape and a vent cover for restricting the flow of gas out of the gas bag through the vent opening, wherein the vent cover is releasably connected to the gas bag; an inflator for providing gas for inflating the gas bag, wherein the gas bag and the inflator are mounted to a retainer; a secondary inflator; and an inflatable gas duct extending from the secondary inflator to the vent cover, wherein a first end of the inflatable gas duct is connected to the retainer, wherein a second end of the inflatable gas duct is connected to the vent cover, wherein the inflatable gas duct includes a tab connected to the retainer, and wherein the tab restricts rotational movement of the inflatable gas duct relative to the retainer. The secondary inflator is in fluid connection with the inflatable gas duct through a port of the retainer. The retainer includes a stud adjacent to the port, where the tab of the inflatable gas duct is connected to the stud of the retainer. The tab of the inflatable gas duct includes an opening that encircles the stud of the retainer. The gas bag further includes a stud opening that encircles the stud of the retainer.

An additional disclosed embodiment is a vehicle airbag comprising a gas bag including a vent opening through which gas can escape and a vent cover for restricting the flow of gas out of the gas bag and through the vent opening, an inflator for providing gas for inflating the gas bag, an inflatable gas duct with a first end connected to a secondary inflator and a second end connected to the vent cover, and a panel extending between the inflatable gas duct and the gas bag to restrict rotational movement of the inflatable gas duct relative to the gas bag. The inflatable gas duct further includes a tab, where the tab is proximate to the first end of the inflatable gas duct, where the tab of the inflatable gas duct is anchored near the secondary inflator. The vehicle airbag further includes a retainer, wherein the tab of the inflatable gas duct is anchored to the retainer. The tab of the inflatable gas duct has an opening that encircles a stud of the retainer. The gas bag may further include a main panel with a tab, wherein the tab of the main panel of the gas bag has an opening that encircles the stud of the retainer. The gas bag and inflator are mounted to the retainer. The gas bag further includes perimeter stitching, where the extended panel of the inflatable gas duct is attached to the gas bag along the perimeter stitching of the gas bag. The extended panel is a part of a reinforcement sheet, wherein the reinforcement sheet is secured over and to the inflatable gas duct.

Many aspects of the current disclosure can be better understood with the references made to the drawings. The components in the drawings are not necessarily drawn to scale. Instead, emphasis is placed upon clearly illustrating the components. Moreover, like reference numerals designate corresponding parts through the several views in the drawings. As will become apparent to one of ordinary skill in the art after reading this document, the illustrated embodiments and their various alternatives can be implemented without confinement to the illustrated examples.

Figure 1:
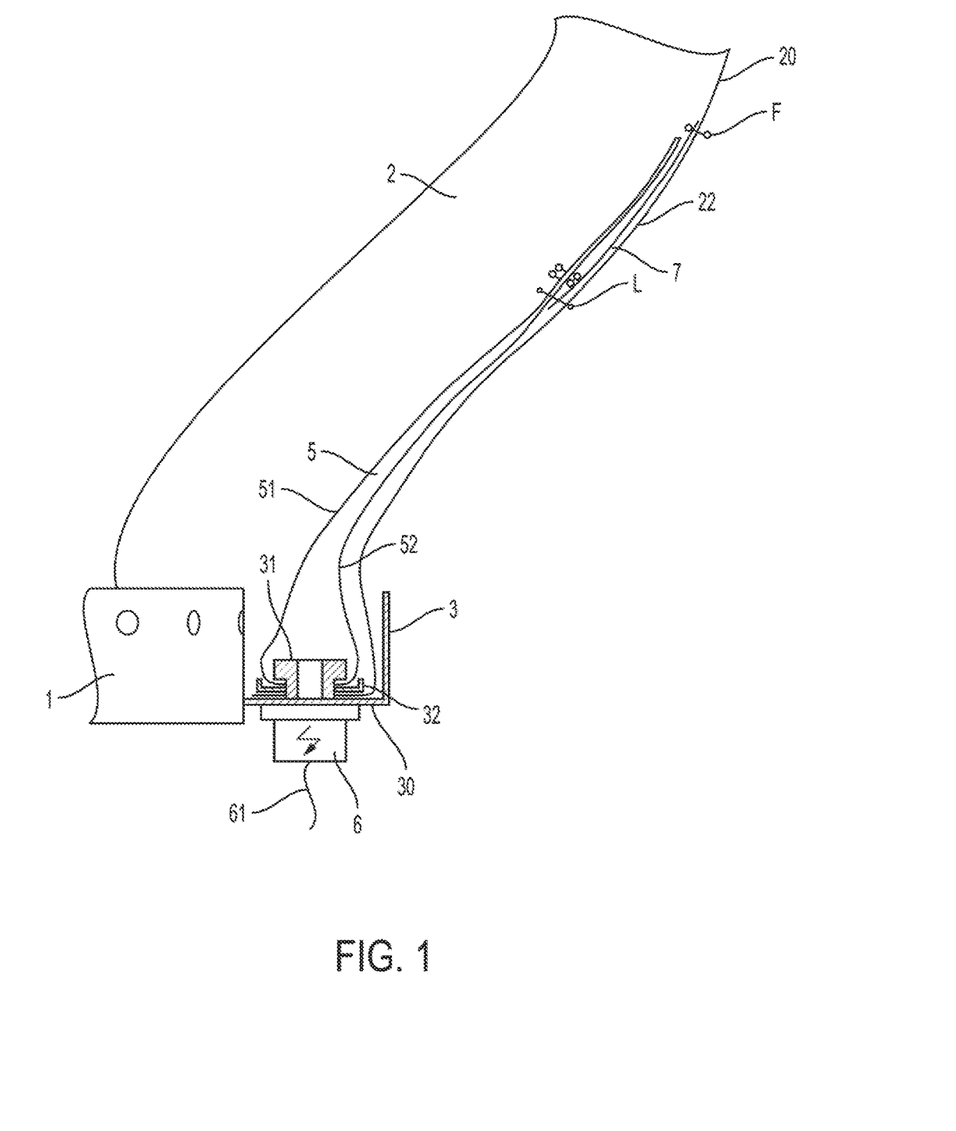
FIG. 1 shows a section through an airbag module without an active vent rotation countermeasure according to selected embodiments of the current disclosure.

FIG. 1 shows a schematic representation of a gas generator 1 for inflating a gas bag 2 without an active vent rotation countermeasure, which before inflation may be stowed in a module housing 3 (in a folded or gathered condition). The airbag module is shown in FIG. 1 in a condition in which the gas bag 2 already is at least partly filled with gas from the gas generator 1 and therefore has exited from the module housing 3.

The gas generator 1, which includes a housing, may be filled with a stored gas and/or chemical substances for generating a gas and may be provided with outlet openings through which gas can exit from the interior of the gas generator 1, in order to fill the gas bag 2, so that the envelope 20 of the bag unfolds and the gas bag 2 expands out of the module housing 3 to protect a vehicle occupant. The gas generator 1 may protrude into the bag through an opening or orifice of the gas bag 2, so that gases exiting from the outlet openings of the gas generator 1 can directly get into the interior of the gas bag 2.

For fixing the gas bag 2 at or in the module housing 3, there are used retaining means in the form of a retaining ring 32 which annularly surrounds the gas generator 1 (pot-shaped in the exemplary embodiment) and clamps the gas bag envelope 20 between that retaining ring 32 and a bottom 30 of the module housing 3 along the edge of the opening into the gas bag 2. The elements for fixing the retaining means at the module housing 3, which at the same time may also serve for generating the clamping force, are not shown. For example, the retaining means may be a screw, a rivet or other latching elements which may also be provided for fixing the gas generator 1 at the module housing 3. For accommodating the gas generator 1 as well as the gas bag 2 before inflation, the module housing 3 includes the above-mentioned bottom and in addition a lateral (circumferential) boundary wall protruding therefrom.

In a region which during inflation of the gas bag 2 gets outside the module housing 3, the gas bag 2 is provided with a vent opening 22 in its envelope 20, through which gas can exit from the interior of the gas bag 2 into the environment. When the airbag 2 is partly inflated, as shown in FIG. 1, the vent opening 22 still is closed by a covering part 7, which in an exemplary embodiment is formed by a one-part flexible fabric portion. The covering part 7 is fixed at its envelope 20 via a fixed connection F, e.g. in the form of at least one seam, along a partial region of its edge, e.g. along the edge of the vent opening 22 of the gas bag 2. Along a second partial region of its edge, the covering part 7 is fixed at its envelope 20 via a releasable connection L, e.g. in the form of at least one tear seam, likewise along the edge of the vent opening 22 of the gas bag 2. The fixed connection F and the releasable connection L jointly enclose the vent opening 22 at least approximately completely.

Apart from the covering part 7, an inflatable element 5 also is fixed at the envelope 20 of the gas bag 2 by the releasable connection L, wherein here the covering part 7 is arranged between the envelope 20 and the inflatable element 5, i.e. the covering part 7 is at least partly covered by the inflatable element 5.

The inflatable element or duct 5 is arranged in the interior of the gas bag 2 and includes an envelope preferably formed of two separate or integrated sheets 51, 52 (e.g. made of fabric), which can be filled with gas from a secondary inflator or gas source 6 (e.g. pyrotechnic). The inflatable element 5 extends from the gas source 6 (in the manner of an inflatable gas duct) in direction of the vent opening 22 without covering the vent opening 22 either in the starting condition or in the filled condition, i.e. the inflatable element 5 extends adjacent to the vent opening 22. At an end portion of the inflatable element 5 facing away from the vent opening 22 the duct 5 is connected to the gas source 6 such that gas released by the gas source 6 gets into the inflatable element or duct 5.

In an exemplary embodiment, the gas source 6 is connected with the module housing 3 (via non-illustrated fastening means), and here is arranged outside the module housing 3, e.g. below the housing bottom. The inflator or gas source may be connected by a cable 61 to a controller which, for example, may process input received from one or more sensors and provide a signal causing a pyrotechnical charge of the gas source 6 to ignite, so that the gas source releases gas for filling the inflatable element 5.

For fixing the inflatable element 5 (within the module housing 3) so that the inflatable element 5 can be filled with gas from the gas source 6 via its one end portion, a fastening element 31 is used, which is arranged within the inflatable element 5 and is designed step-like such that a first region of the fastening element 31 is located inside the inflatable element 5, while a second, stepped region reaches through an opening of the inflatable element 5 and is fixed at the retaining ring 32.

A fixation of the fastening element 31 at the retaining ring 32, so the inflatable element 5 also is attached thereto, for example can be effected in a positive manner, in particular by latching. The fastening element 31 may be designed as a clip to be snapped (with its second region) into the associated opening of the retaining ring 32. With its second region protruding from the inflatable element 5 and reaching through the retaining ring 32 and in addition the gas bag 2, the fastening element 31 extends up to the gas source 6 and is provided with a through opening through which gas released from the gas source 6 can get into the interior of the inflatable element 5.

In addition, or in the alternative, to the fastening element 31, which at the same time serves for introducing gas, further fastening means also can be provided for fixing the inflatable element 5 at the retaining ring 32 and/or at the module housing 3, e.g. rivets or clamps.

Without any active vent rotation countermeasure, as shown in FIG. 1, the active vent and/or gas bag may rotate relative to each other and/or the retainer.

Figure 2:
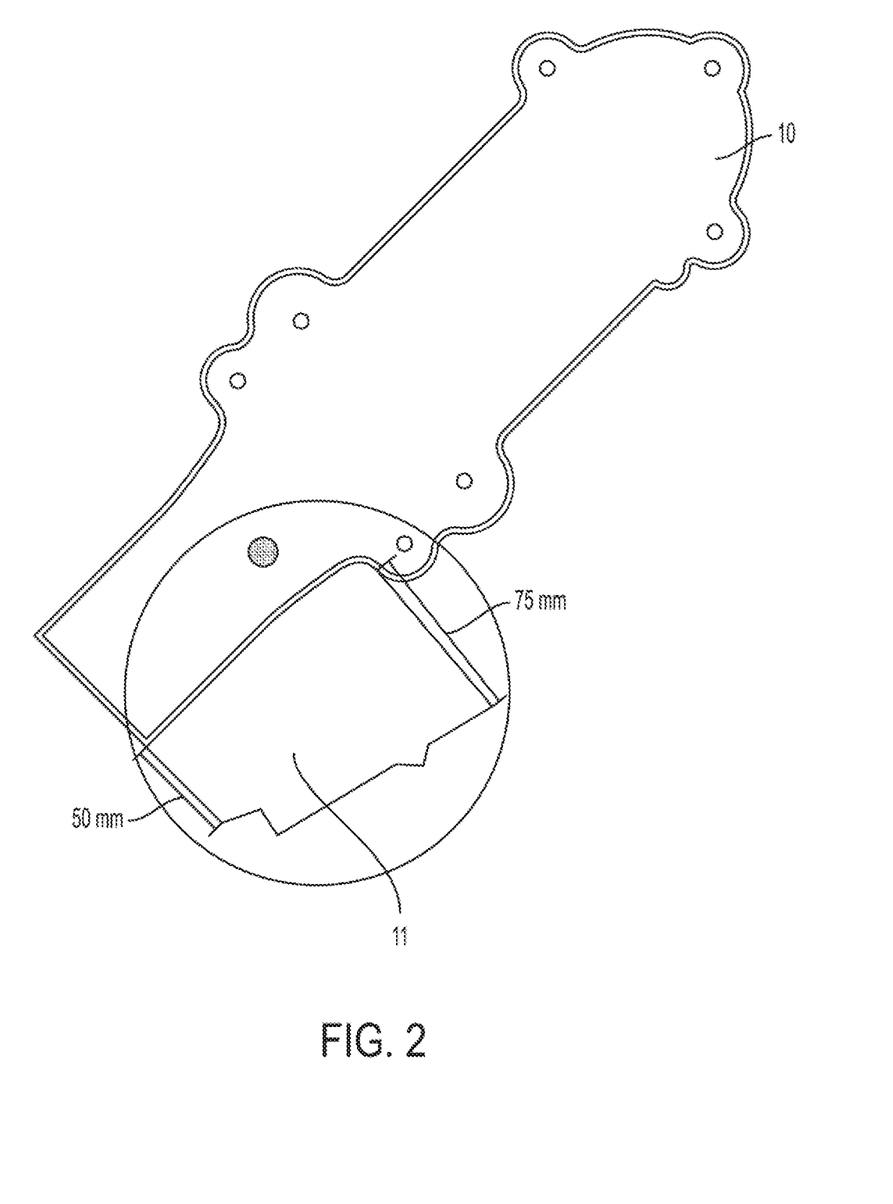
FIG. 2 shows an active vent reinforcement sheet with an extended panel according to selected embodiments of the current disclosure.

FIG. 2 shows an active vent reinforcement sheet with an extended panel according to selected embodiments of the current disclosure. The reinforcement sheet 10 includes an extended panel 11 that, in this embodiment, is a somewhat trapezoidal shaped panel extending away from the main portion of the reinforcement sheet 10. When sewing the active vent reinforcement sheet to the side panel of the gas bag, the extended panel of the active vent reinforcement sheet and the side panel are aligned for sewing. The main portion of the reinforcement sheet is sewn into the active vent tube assembly, providing structural and/or heat reinforcement. The extended panel of the reinforcement sheet is connected to the side panel and thereby prevents rotation of the active vent tube.

Figure 3:
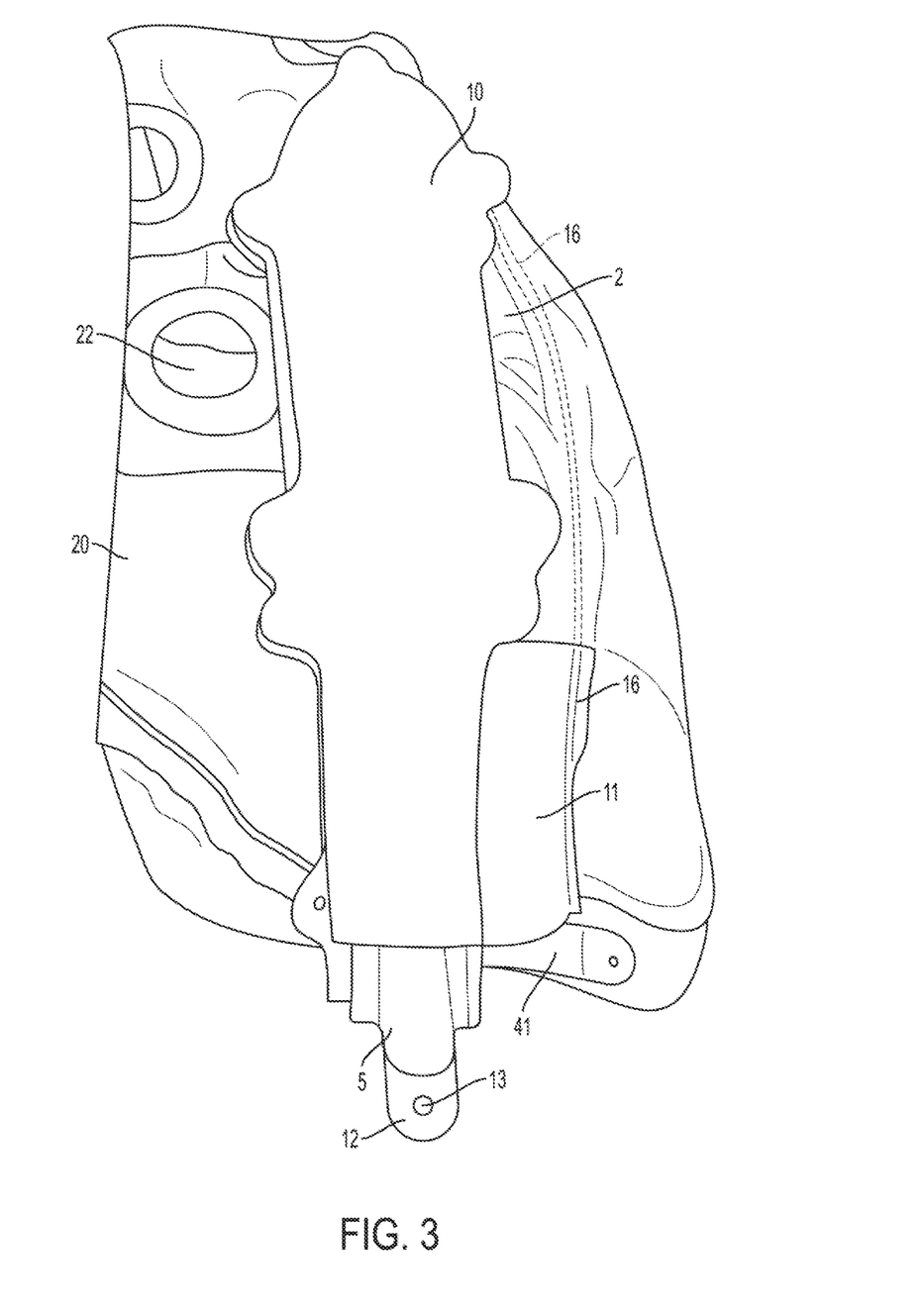
FIG. 3 shows an active vent reinforcement panel secured to an inflatable gas duct and gas bag according to selected embodiments of the current disclosure.

FIG. 3 shows an active vent reinforcement sheet secured to an inflatable gas duct and gas bag according to selected embodiments of the current disclosure. The active vent reinforcement sheet 10 may be secured over and to the inflatable gas duct 5 (shown extending from the bottom of the reinforcement sheet in this view) as well as to the envelope 20 of the gas bag 2, e.g., by stitching. In this figure, the reinforcement sheet 10 is shown adjacent to the vent opening 22 in the envelope 20 of the gas bag 2. The extended panel 11 of the reinforcement sheet 10 is secured to the gas bag, e.g. along perimeter stitching 16 of the gas bag 2. The extended panel 11 has extra fabric to allow the inflatable gas duct to move freely within the cushion during deployment, therefore not having an effect on trajectory, yet is short enough to restrict 360-degree movement of the inflatable gas duct relative to the gas bag. Also shown in FIG. 3 is a tab 12 of the inflatable gas duct 5, discussed in more detail below. The reinforcement sheet 10 is positioned and secured to the inflatable gas duct 5 so as to allow for the tab 12 to extend away from the inflatable gas duct when such a tab exists. In addition, the main panel of the gas bag may include a tab 41 that extends away from the main panel to be anchored near the secondary gas generator. The tab 41 may be anchored together with the tab 12 of the inflatable gas duct. These tabs function to prevent movement of the gas bag and gas duct relative to the secondary gas generator.

In an exemplary embodiment of assembling the gas bag, the active vent tube assembly may be pulled through the main port or inflator mouth of the gas bag such that it is located externally. The active vent tube assembly is then secured to the retainer, e.g., the retainer shown in FIG. 6, by a clamp 15, e.g., an Oetiker clamp. The retainer is then passed back through the main inflator opening of the gas bag into the interior of the gas bag. The studs of the retainer are then passed through the corresponding openings of the gas bag, more clearly shown in FIG. 7, to secure the gas bag to the retainer. Alternatively, the active vent tube assembly, which includes the inflatable gas duct 5 and reinforcement sheet, may be inserted through the main port or inflator mouth of the gas bag, discussed further below, and fastened to a retainer using a clamp.

The above embodiments are shown with the extended panel as a part of a separate reinforcement sheet that is secured around and to the inflatable gas duct. Nonetheless, alternative embodiments provide for an extended panel that is a separate sheet, or is otherwise integrated into or with the inflatable gas duct or its components therein. The extended panel extends between the inflatable gas duct and the gas bag to restrict rotational movement of the inflatable gas duct relative to the gas bag.

Figure 4:
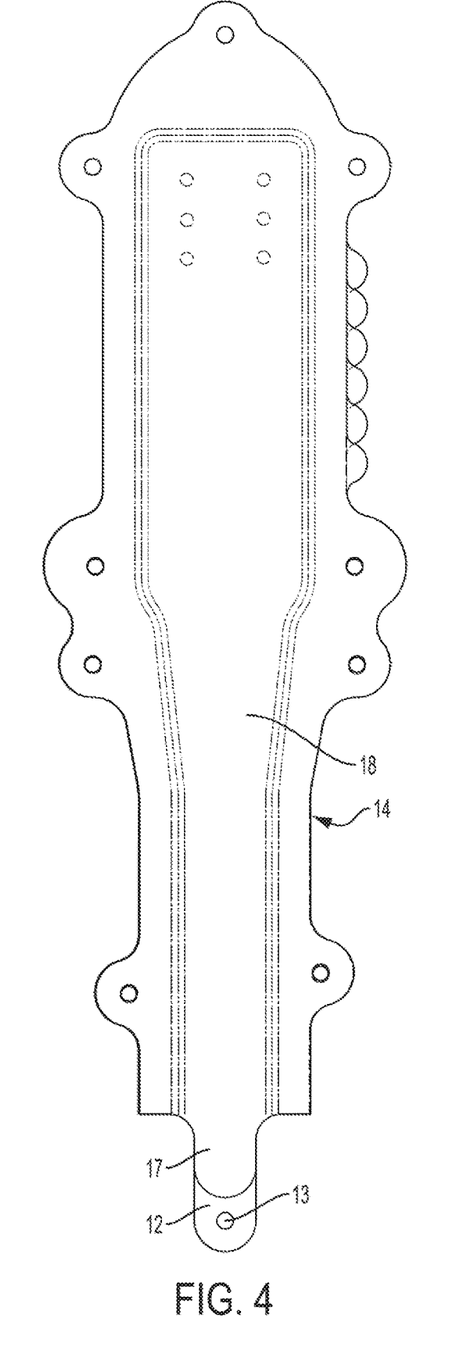
FIG. 4 shows an inflatable gas duct with a tab according to selected embodiments of the current disclosure.
Figure 5:
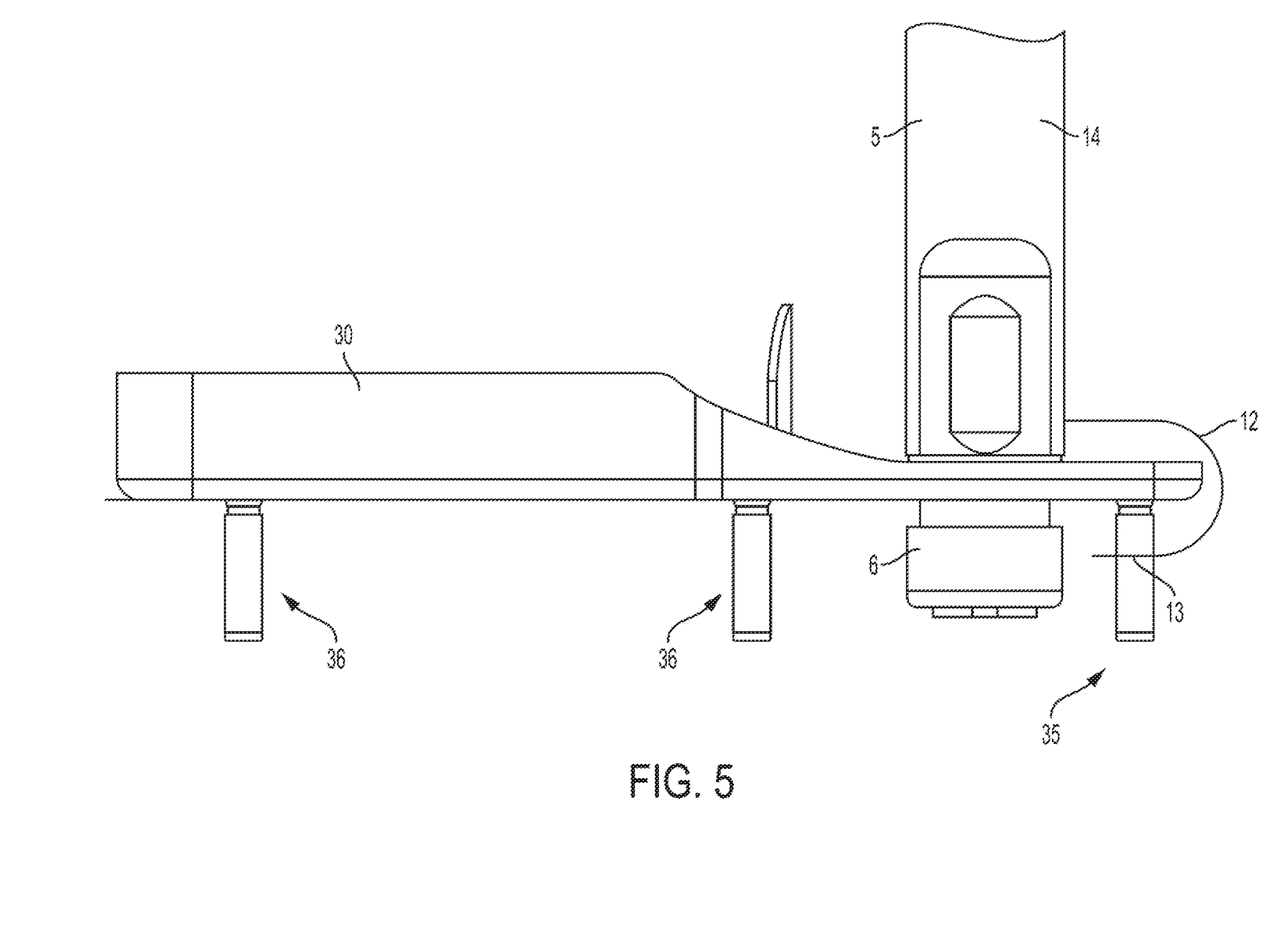
FIG. 5 shows an inflatable gas duct secured to a retainer according to selected embodiments of the current disclosure.

FIG. 4 shows an inflatable gas duct with a tab according to selected embodiments of the current disclosure. The inflatable gas duct has inflatable gas duct panel 18 over another inflatable gas duct panel 14. The inflatable gas duct panel 18 includes a small tab 17, while the inflatable gas duct panel 14 includes a tab 12 that extends further away from the main portion of the panel 14. The tab 12, as discussed in more detail below, is anchored near a secondary gas generator, or MGG, to restrict rotational movement of the inflatable gas duct, e.g. relative to the secondary gas generator. The tab includes an opening 13, which is used to anchor the tab, e.g., to a stud or other fastening element. For example, the tab 12 may be anchored to the stud 35, as shown in FIG. 5. The shorter tab 17 extends a sufficient distance to provide a surface for a clamp (e.g., clamp 15 shown in FIG. 6) to secure the inflatable gas duct to the MGG or secondary port of the retainer.

The tab of the inflatable gas duct restricts rotational movement of the inflatable gas duct. When the tab is anchored or otherwise secured to a location some distance away from the main body of the inflatable gas duct 5, rotation of the inflatable gas duct will pull on the tab. Because the end of the tab is anchored, it will resist such rotational movement. While the length of the tab may be long enough to allow for easy installation and some minor rotational movement of the inflatable gas duct, it should nonetheless be sufficiently short to restrict if not prevent rotational movements of the inflatable gas duct of more than 180 degrees relative to the secondary gas inflator which is used to inflate the inflatable gas duct, particularly when the tab is used in conjunction with the extended panel described above.

FIG. 5 shows an inflatable gas duct secured to a retainer according to selected embodiments of the current disclosure. The inflatable gas duct 5 is secured to a secondary gas generator 6 via a retainer 30. A tab 12 extending away from the inflatable gas duct panel 14 of the inflatable gas duct 5 includes an opening 13, which may be used to anchor the tab to a location near secondary gas generator 6. The tab 12 may be anchored to a stud 35 or other fastening element of the retainer 30. The tab 12 has an opening 13 which encircles the stud 35.

Figure 6:
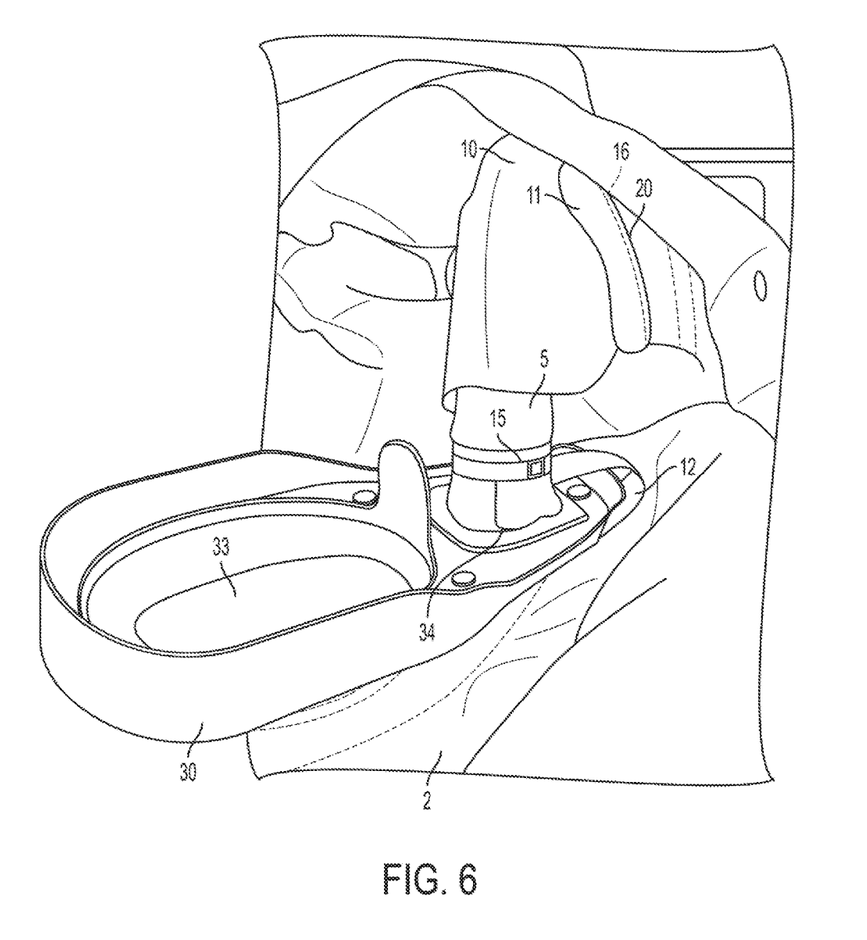
FIG. 6 shows a perspective view of an inflatable gas duct with a tab according to selected embodiments of the current disclosure.

FIG. 6 shows an inflatable gas duct with a tab according to selected embodiments of the current disclosure. A retainer 30 includes a main port 33 and a secondary port 34. The main port 33 provides fluid access to the inside of the envelope of the gas bag, through which the airbag is inflated. The inflatable gas duct 5 is secured to the secondary port 34 of the retainer, e.g., by a clamp. A tab 12 extends from the inflatable gas duct panel 14 of the inflatable gas duct 5 and is anchored nearby to a stud (not visible in this view) of the retainer 30. The tab 12 has an opening 13 which encircles the stud. Studs 36 may be provided for attaching the inflator and the gas bag to the retainer 30.

Figure 7:
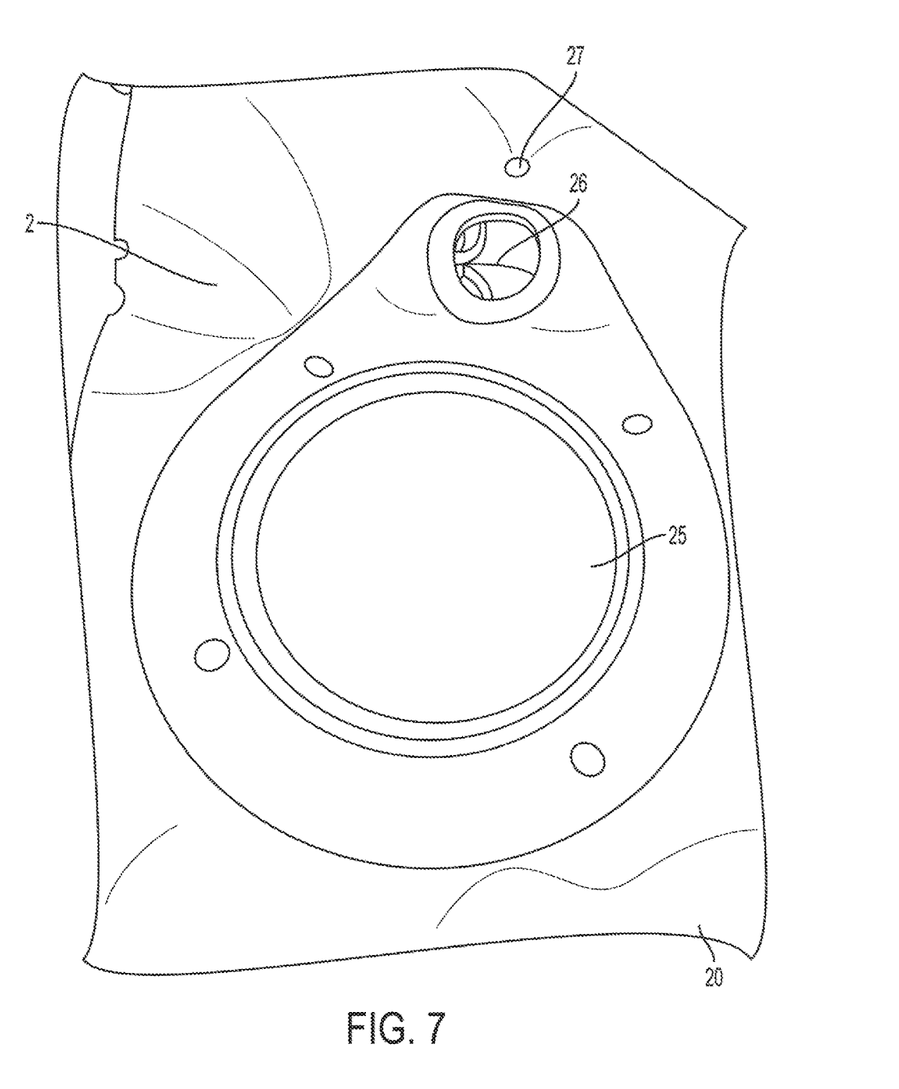
FIG. 7 shows a portion of a gas bag according to selected embodiments of the current disclosure.

FIG. 7 shows a portion of a gas bag according to selected embodiments of the current disclosure. The gas bag 2 includes an envelope 20 with several ports or openings extending therethrough. In FIG. 7, the main port 25, secondary port 26, and anchor opening 27 are shown. The main port 25 mates with the main port of the retainer (not shown in this figure) and provides fluid access to the inside of the gas bag 2, e.g., for inflation from a primary gas generator or inflator. The secondary port 26 mates with the secondary port 34 of the retainer and provides fluid access to the inflatable gas duct 5 (not shown in this figure), e.g., for inflation from a secondary gas generator. The anchor port 27 provides an opening through which a stud or other fastening element of the retainer may extend through, or alternatively, an opening through which the tab of the inflatable duct may otherwise be anchored.

Figure 8:
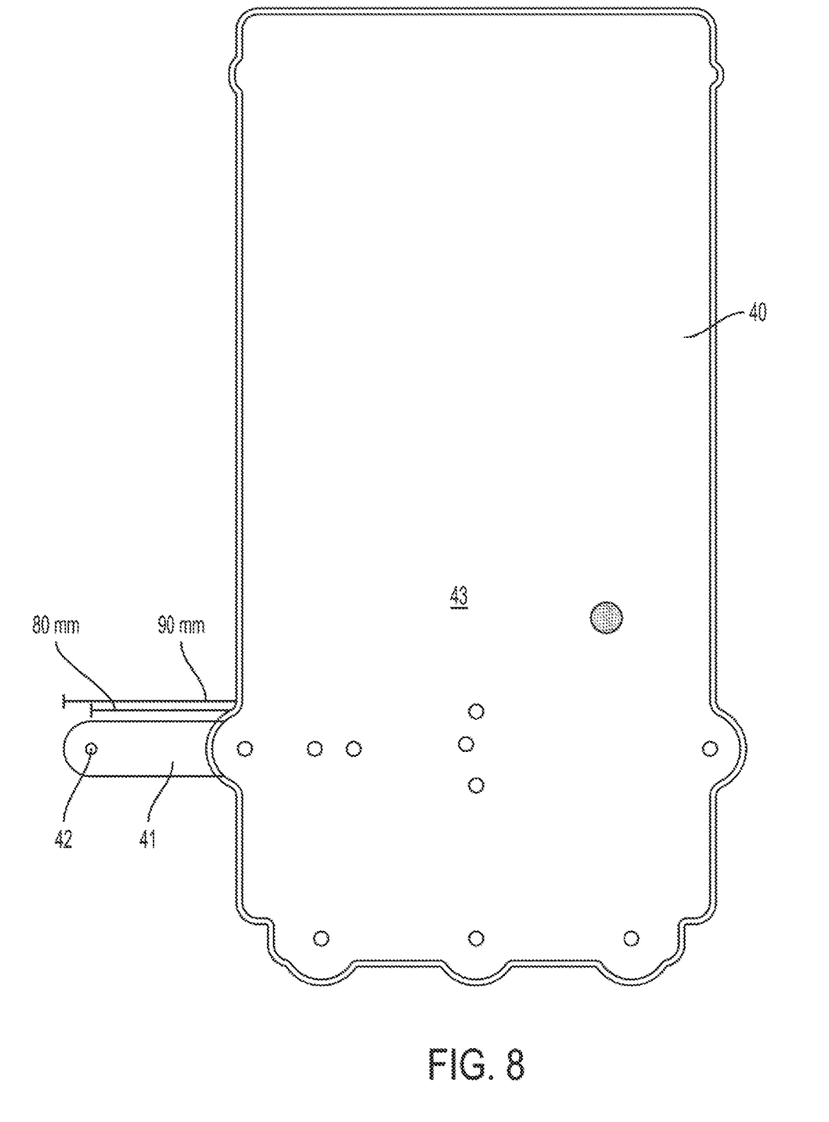
FIG. 8 shows a main panel with a tab according to selected embodiments of the current disclosure.

FIG. 8 shows a main panel with a tab according to selected embodiments of the current disclosure. The main gas bag panel 40 includes a tab 41, which extends away from the main portion of the panel 43. The tab 41 anchors near a secondary gas generator, or MGG, to restrict rotational movement of the gas bag, e.g. relative to the secondary gas generator. The tab includes an opening 42, which is used to anchor the tab 41, e.g., to a stud or other fastening element. In some embodiments, the anchor tab 41 is secured to the same stud that the tab of the inflatable gas duct is secured to, that is, stud 35 shown in FIG. 5. A particular embodiment of the current disclosure provides for the tab 41 extending ninety (90) mm away from the main portion of the panel 43, and the opening 42 is eighty (80) mm away from the main portion of the panel 43.

Figure 9:
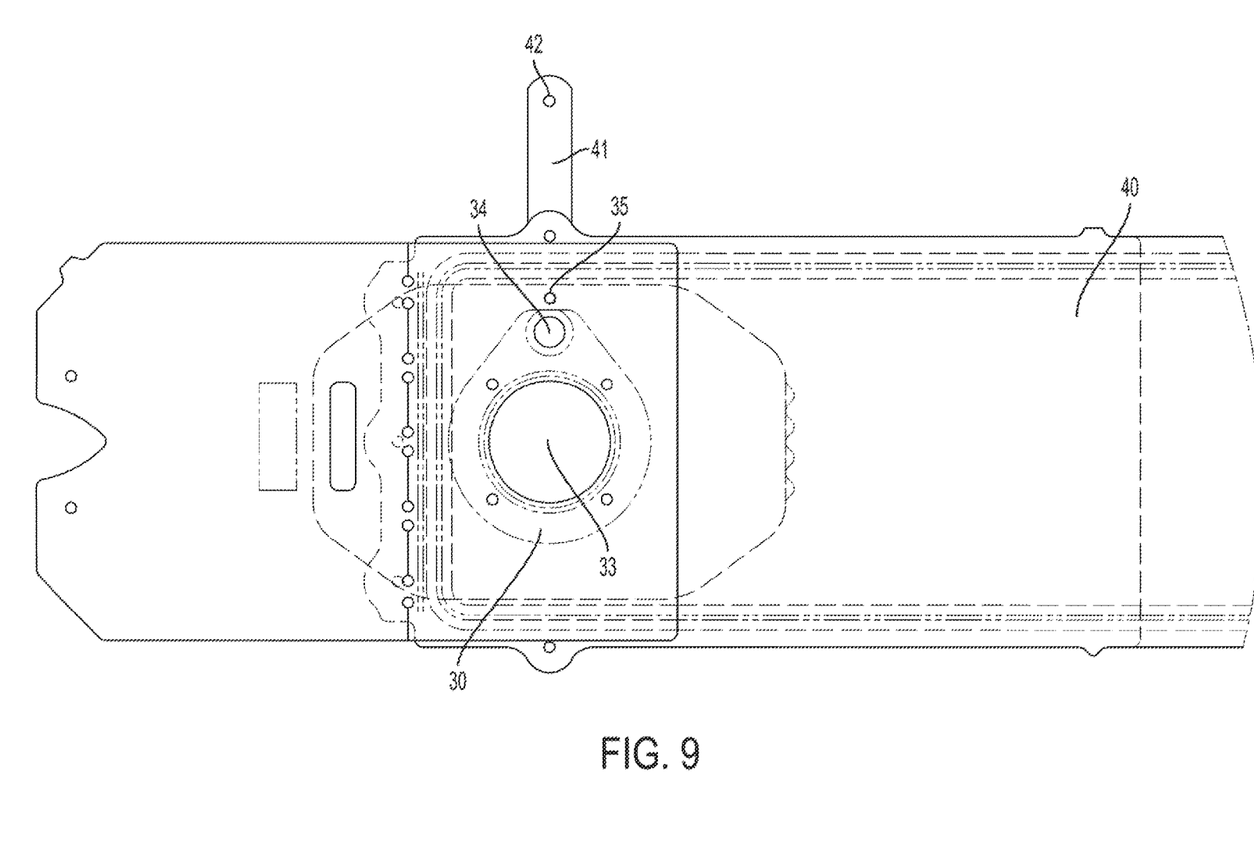
FIG. 9 shows a main panel and retainer according to selected embodiments of the current disclosure.

FIG. 9 shows a main panel and retainer according to selected embodiments of the current disclosure. The main panel 40 is shown under the retainer 30. The retainer 30 includes a main port 33 through which the gas bag is inflated, secondary port 34 through which the inflatable gas duct is inflated, and a stud 35. The main panel 40 is shown with the tab 41 extending therefrom. The tab 41 has an opening 42, where the tab 41 extends around the retainer 30 and is secured to stud 35 via opening 42. The main panel may, in certain embodiments, be secured to a side panel.

The above embodiments are shown with the tab as a part of a panel of the inflatable gas duct. Nonetheless, alternative embodiments provide for a tab that is a separate sheet in and of itself, or is otherwise integrated into or with a separate sheet or element that is otherwise secured to the inflatable gas duct. The tab extends between the inflatable gas duct and an anchor point to restrict rotational movement of the inflatable gas duct relative to the anchor point. The anchor point may be a stud on a retainer or other fixed element relative to the secondary gas generator. Furthermore, the tab may not have an opening, but rather may be secured by other means to the anchor point, including screws, rivets, adhesives, and clamps.

While various embodiments have been described above, it should be understood that they have been presented by way of example only, and not of limitation. Likewise, the various diagrams may depict exemplary configurations which are provided to aid in understanding the features and functionality that can be included. The current disclosure is not restricted to the illustrated example architectures or configurations, but the desired features can be implemented using a variety of alternative architectures and configurations.

Indeed, it will be apparent to one of skill in the art how alternative functional configurations can be implemented to implement the desired features. Although the current disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. An airbag module comprising
a gas bag including a vent opening through which gas can escape from the gas bag,
an inflator for providing gas for inflating the gas bag,
a movable vent cover that restricts gas from escaping from the gas bag through the vent opening,
an inflatable gas duct, wherein a first end of the inflatable gas duct is located near the inflator and a second end of the inflatable gas duct is connected to the vent cover, wherein the inflatable gas duct includes a tab that is proximate to the first end of the inflatable gas duct, wherein the tab is anchored near the inflator to restrict rotational movement of the inflatable gas duct relative to the inflator, and wherein the inflatable gas duct is configured so that upon inflation of the gas duct the vent cover moves out of a position blocking the vent opening to thereby allow gas to escape from the gas bag through the vent opening.

2. The airbag module of claim 1, further comprising a secondary inflator, where the secondary inflator is connected to the first end of the inflatable gas duct.

3. The airbag module of claim 1, further comprising a retainer including a stud, wherein the tab of the inflatable gas duct is anchored to the stud.

4. The airbag module of claim 3, wherein the retainer further includes a main port and a secondary port, where the gas bag is mounted to the main port, where the inflatable gas duct is mounted to the secondary port.

5. The airbag module of claim 3, wherein the inflator is in fluid connection with the gas bag through the main port of the retainer.

6. The airbag module of claim 3, wherein the tab of the inflatable gas duct has an opening encircling the stud of the retainer thereby anchoring the tab to the stud.

7. The airbag module of claim 1, further comprising a secondary inflator and a retainer including a port and stud, where the stud is proximate to the port, where the secondary inflator is connected to the first end of the inflatable gas duct through the port, and where the tab of the inflatable gas duct is anchored to the stud.

8. The airbag module of claim 1, further comprising a reinforcement sheet, wherein the reinforcement sheet is secured over and to the inflatable gas duct, wherein the reinforcement sheet includes an extended panel secured to the gas bag to restrict rotational movement relative to the gas bag.

9. An airbag module for protecting an occupant of a vehicle comprising
an inflatable gas bag including a vent opening through which gas can escape and a vent cover for restricting the flow of gas out of the gas bag through the vent opening, wherein the vent cover is releasably connected to the gas bag;
an inflator for providing gas for inflating the gas bag, wherein the gas bag and the inflator are mounted to a retainer;
a secondary inflator; and
an inflatable gas duct extending from the secondary inflator to the vent cover, wherein a first end of the inflatable gas duct is connected to the retainer, wherein a second end of the inflatable gas duct is connected to the vent cover, wherein the inflatable gas duct includes a tab connected to the retainer, and wherein the tab restricts rotational movement of the inflatable gas duct relative to the retainer.

10. The airbag module of claim 9, where the secondary inflator is in fluid connection with the inflatable gas duct through a port of the retainer.

11. The airbag module of claim 10, wherein the retainer includes a stud adjacent to the port, where the tab of the inflatable gas duct is connected to the stud of the retainer.

12. The airbag module of claim 11, wherein the tab of the inflatable gas duct includes an opening that encircles the stud of the retainer.

13. The airbag module of claim 11, wherein the gas bag further includes a stud opening that encircles the stud of the retainer.

14. An airbag for protection an occupant of a vehicle comprising
a gas bag including a vent opening through which gas can escape and a vent cover for restricting the flow of gas out of the gas bag and through the vent opening,
an inflator for providing gas for inflating the gas bag,
an inflatable gas duct with a first end connected to a secondary inflator and a second end connected to the vent cover,
and a panel extending between the inflatable gas duct and the gas bag to restrict rotational movement of the inflatable gas duct relative to the gas bag, wherein the inflatable gas duct further includes a tab, where the tab is proximate to the first end of the inflatable gas duct, where the tab of the inflatable gas duct is anchored near the secondary inflator.

15. The airbag of claim 14, further comprising a retainer, wherein the tab of the inflatable gas duct is anchored to the retainer.

16. The airbag of claim 15, wherein the tab of the inflatable gas duct has an opening that encircles a stud of the retainer.

17. The airbag of claim 16, wherein the gas bag further includes a main panel with a tab, wherein the tab of the main panel of the gas bag has an opening that encircles the stud of the retainer.

18. An airbag for protection an occupant of a vehicle comprising
a gas bag including a vent opening through which gas can escape and a vent cover for restricting the flow of gas out of the gas bag and through the vent opening,
an inflator for providing gas for inflating the gas bag,
an inflatable gas duct with a first end connected to a secondary inflator and a second end connected to the vent cover,
and a panel extending between the inflatable gas duct and the gas bag to restrict rotational movement of the inflatable gas duct relative to the gas bag, wherein the gas bag further includes perimeter stitching, where the extended panel of the inflatable gas duct is attached to the gas bag along the perimeter stitching of the gas bag.

19. An airbag for protection an occupant of a vehicle comprising
a gas bag including a vent opening through which gas can escape and a vent cover for restricting the flow of gas out of the gas bag and through the vent opening,
an inflator for providing gas for inflating the gas bag, an inflatable gas duct with a first end connected to a secondary inflator and a second end connected to the vent cover, and a panel extending between the inflatable gas duct and the gas bag to restrict rotational movement of the inflatable gas duct relative to the gas bag, wherein the extended panel is a part of a reinforcement sheet, wherein the reinforcement sheet is secured over and to the inflatable gas duct.

* * * * *